W. G. PINGEL.
NUT LOCK.
APPLICATION FILED JUNE 22, 1916.
1,239,958.
Patented Sept. 11, 1917.
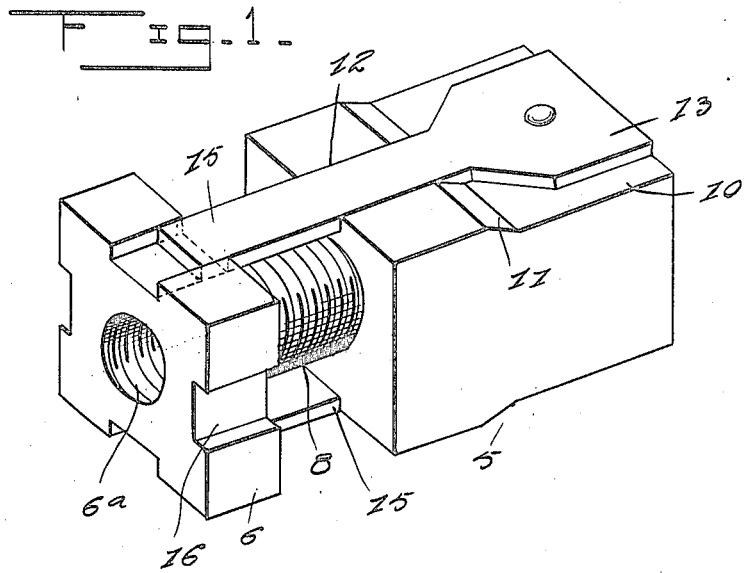
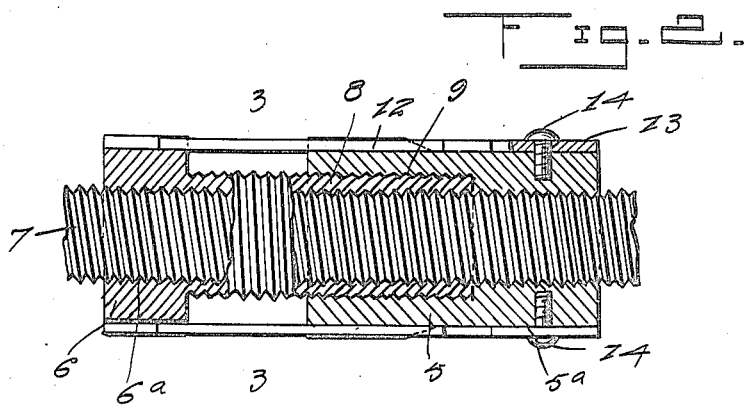
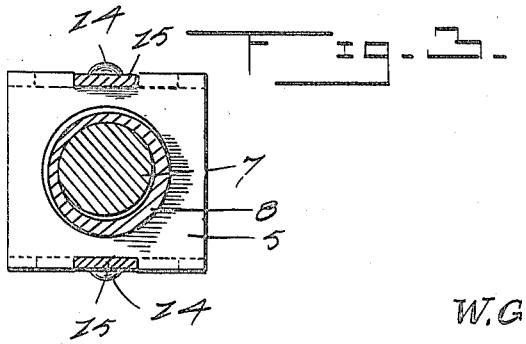
Witness
CRBeale.
Inventor
W.G. Pingel.
By
Attorney

UNITED STATES PATENT OFFICE.

WILL G. PINGEL, OF WITHEE, WISCONSIN, ASSIGNOR OF ONE-HALF TO WILL ROHAN, OF WITHEE, WISCONSIN.

NUT-LOCK.

1,239,958.  Specification of Letters Patent.  Patented Sept. 11, 1917.

Application filed June 22, 1916. Serial No. 105,185.

*To all whom it may concern:*

Be it known that I, WILL G. PINGEL, a citizen of the United States, residing at Withee, in the county of Clark and State of Wisconsin, have invented certain new and useful Improvements in Nut-Locks; and I do hereby declare the following to be a full, clear, and exact description of the invention, such as will enable others skilled in the art to which it appertains to make and use the same.

This invention has for its object to provide an improved and simplified type of nut lock including essentially a nut consisting of two parts or sections providing means whereby the sections may be locked in any adjusted position longitudinally of the bolt.

Another object is the provision of means for locking the sections of the nut in adjusted relative position.

With these and other objects in view, the invention consists in the novel construction, combination and arrangement of parts as will be hereinafter specifically described, claimed and illustrated in the accompanying drawing, in which:

Figure 1 represents a perspective view of the nut lock removed from the bolt.

Fig. 2 represents a longitudinal sectional view through the nut lock and bolt.

Fig. 3 represents a transverse sectional view on the line 3—3 of Fig. 2.

Referring to the drawing in detail, wherein similar reference numerals designate corresponding parts throughout the several views, the nut lock includes two companion sections designated, respectively, by the numerals 5 and 7, each provided with an internally screw threaded bore 5$^a$ and 6$^a$, respectively, adapted to receive a preferred type of bolt 7. The section 6, which is arranged upon the bolt outwardly of the section 5 is formed with an integral tubular extension 8, having external screw threads adapted to fit in the enlarged and internally screw threaded portion 9 of the bore 5$^a$ of the section 5. The screw threads of the extension 8 are of a greater or less pitch or inclination than the screw threads of the bolt 7, for a purpose which will hereinafter appear.

The inner nut section 5 is formed upon two of the opposed side faces thereof with depressions 10, providing inclined shoulders 11, and communicating with recesses 12 extending in parallel relation to the bore 5$^a$. A spring locking member 13 is pivotally secured at 14 by a pin or equivalent means in each depression 10 and is formed with a reduced extension or finger 15 adapted to engage in any one of the several recesses 16 formed in the side faces of the nut section 6.

In use, the sections 5 and 6 of the nut are adjusted relatively so as to aline the internal screw threads thereof and facilitate application of the two sections bodily upon the bolt 7. When the nut has been advanced to the desired position upon the screw threads of the bolt 7 the outer nut section 6 is turned relatively to the inner section 5 and the difference in the pitch of the threads on the extension 8 and bolt 7 effectively bind or lock the sections in adjusted position upon the bolt. The sections 5 and 6 are initially adjusted so as to aline the internal screw threads thereof, and the spring locking members 13 are swung laterally of the nut section 5 by the pivot pins 14 so as to permit free movement of the sections 5 and 6. After the adjustment of the sections the spring locking members 13 are swung to the position illustrated in Fig. 1 and are engaged in the recesses 16 of the nut section 6, thereby holding the sections in adjusted position and permitting them to be conveniently applied to the bolt 7. It will also be understood that the spring locking members 13 are utilized to lock the sections against relative movement subsequent to the final adjustment of the outer section 6 with relation to the inner section 5.

What is claimed is:

1. A nut lock comprising a nut including two sections each having an internally screw-threaded bore, one of the sections having the end of the bore adjacent the other section enlarged and screw-threaded, a tubular screw-threaded extension carried by said other section removably fitted in the enlarged end of said bore, and means pivotally carried by one of said members for locking the sections against relative rotary movement, said means being adapted to be swung laterally of said sections, whereby said sections can be adjusted relative to each other.

2. A nut lock comprising inner and outer sections, means to lock said sections against rotary movement upon a bolt, the outer section having a series of recesses in the side faces thereof, the inner member having two of its opposite side faces provided with depressions and communicating recesses extending in parallel relation to the bore, the recesses in the outer and inner sections being adapted to register, a spring locking member, said locking member having a reduced section adapted to engage in any of the registering recesses, in said sections, for locking said sections against relative rotary movement, and means for pivotally securing the spring locking members in said depressions, whereby said locking members can be lifted out of said recesses and swung laterally of said members.

In testimony whereof I affix my signature in presence of two witnesses.

WILL G. PINGEL.

Witnesses:
   W. C. TUFTS,
   C. H. BULFUSS.